United States Patent
Wang et al.

(10) Patent No.: US 7,017,255 B2
(45) Date of Patent: Mar. 28, 2006

(54) ADHESIVE ENCAPSULATED BLIND RIVET SYSTEM

(75) Inventors: Pei-Chung Wang, Troy, MI (US); Robin Stevenson, Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 364 days.

(21) Appl. No.: 10/408,840

(22) Filed: Apr. 7, 2003

(65) Prior Publication Data

US 2004/0194284 A1    Oct. 7, 2004

(51) Int. Cl.
*B21D 39/00* (2006.01)
*F16B 39/02* (2006.01)

(52) U.S. Cl. ............... 29/524.1; 29/525.05; 29/525.06; 29/525.13; 29/530; 29/458; 411/34; 411/82; 411/930

(58) Field of Classification Search ............... 29/524.1, 29/525.01, 525.05, 525.06, 525.13, 530, 29/458, 460, 243.53, 243.521, 243.522; 411/82, 411/43, 34, 45, 930, 501
See application file for complete search history.

(56) References Cited

U.S. PATENT DOCUMENTS

| | | | |
|---|---|---|---|
| 3,772,957 A | 11/1973 | Newton | |
| 4,629,380 A * | 12/1986 | Gunkel et al. ................. | 411/29 |
| 4,659,268 A | 4/1987 | Del Mundo et al. | |
| 4,904,136 A | 2/1990 | Matsumoto | |
| 5,025,128 A | 6/1991 | Derbyshire | |
| 5,375,953 A | 12/1994 | Krug et al. | |
| 5,473,806 A | 12/1995 | Krug et al. | |
| 5,680,690 A * | 10/1997 | Briles et al. ................... | 29/458 |
| 6,012,888 A * | 1/2000 | Meyer et al. .............. | 411/82.3 |
| 6,183,179 B1 | 2/2001 | Gaquere | |
| 6,389,676 B1 | 5/2002 | Denham | |
| 6,732,420 B1 * | 5/2004 | Wang et al. ............. | 29/525.06 |
| 6,751,841 B1 * | 6/2004 | Schnabel et al. .......... | 29/524.1 |
| 6,868,597 B1 * | 3/2005 | Stevenson et al. ............ | 29/460 |
| 6,877,204 B1 * | 4/2005 | Schnabel et al. ............. | 29/512 |
| 6,896,462 B1 * | 5/2005 | Stevenson et al. ............ | 411/82 |
| 6,905,295 B1 * | 6/2005 | Stevenson et al. ............ | 411/34 |
| 2004/0071503 A1 * | 4/2004 | Jones et al. .................. | 403/267 |
| 2004/0170490 A1 * | 9/2004 | Wang et al. ................. | 411/501 |
| 2005/0019131 A1 * | 1/2005 | Stevenson et al. ............ | 411/82 |
| 2005/0019136 A1 * | 1/2005 | Jones .......................... | 411/501 |
| 2005/0089384 A1 * | 4/2005 | Pratt ........................... | 411/82 |

* cited by examiner

Primary Examiner—Essama Omgba
(74) Attorney, Agent, or Firm—Kathryn A. Marra

(57) ABSTRACT

A blind rivet system including a number of parts to be joined that have aligned holes. A tubular rivet body is disposed in the aligned holes and includes a rivet head portion and a sleeve portion. The head portion and sleeve portion include a longitudinal bore. A mandrel having a head portion greater in diameter than the bore and a shaft portion is disposed within the longitudinal bore. An adhesive is disposed in an annular space defined by the interior surface of the bore and an exterior surface of the shaft portion. An installation tool having a seal intersects with the rivet head portion such that when the head portion is drawn within the bore during installation, the adhesive is maintained within the tubular rivet body and extruded from the annular space to a region between faying surfaces of the parts to be joined.

6 Claims, 2 Drawing Sheets

ADHESIVE ENCAPSULATED BLIND RIVET SYSTEM

FIELD OF THE INVENTION

This invention relates to a blind rivet system. More specifically, this invention relates to an adhesive encapsulated blind rivet system.

BACKGROUND OF THE INVENTION

Blind rivets or rivets that can be installed by access to only one side of a workpiece are well-known in the art. Generally a blind rivet includes a tubular shell or sleeve that has a longitudinal bore. Also, included is a mandrel that generally has a head having a diameter greater than that of the bore of the shell or sleeve and including a shank extending from the head of the mandrel that is housed within the bore of the sleeve.

In use, the shank is inserted through aligned apertures formed in a workpiece that includes two parts to be riveted together. The shell is inserted through the aligned apertures in a workpiece such that the shell abuts a face of the workpiece. The mandrel is then inserted into the shell such that the shank of the mandrel protrudes beyond an opposite face of the workpiece. A pulling force is then applied to the mandrel shank relative to the shell. The pulling force causes the mandrel head to deform the shell radially outwards to form a blind head which abuts a face of the workpiece. In this manner, the workpiece members are clamped together between a preformed head of the shell and the blind head formed by the pulling force on the mandrel shank.

While blind riveting provides a useful method of attaching various structural components from one side, there is a need to improve the mechanical strength of such a riveted joint. Studies have shown that blind riveted joints provide higher fatigue strength as compared to other fastening methods such as spot welding, but they have less static strength. There is, therefore, a need to provide a blind rivet having improved static strength as well as providing a strong rivet bonded joint between the rivet and the material to be joined.

SUMMARY OF THE INVENTION

This invention provides a blind rivet system for joining a plurality of parts. The plurality of parts includes holes that are aligned to facilitate joining of the parts. A tubular rivet body is disposed in the aligned holes and includes a rivet head portion that mates with a surface of one of the parts to be joined and a sleeve portion that extends from the rivet head portion and through the aligned holes. The rivet head portion and sleeve portions include a longitudinal bore for accepting a mandrel. The mandrel includes a head portion having a diameter that is greater than the bore formed in the sleeve portion. A shaft portion extends from the head portion, and it is disposed within a bore formed in the sleeve. In this manner, the head portion is disposed proximate the end of the tubular rivet body opposite the rivet head portion. An adhesive is disposed in an annular space that is defined by an interior surface of the bore and an exterior surface of the shaft portion.

The blind rivet system also includes an installation tool having a seal that intersects and seals the rivet head portion when during installation the head portion is drawn within the bore of the tubular rivet body to form a blind head. Simultaneously, during installation the adhesive disposed in the annular space is extruded through a plurality of holes formed within the sleeve portion. The adhesive flows from the annular space to a region between the faying surfaces of the parts to be joined, as well as to a region between the tubular rivet body and interior surfaces of the aligned holes of the parts to be joined. As a result of the extrusion of a portion of the adhesive, the mechanical strength of a bond between the rivet and the parts to be joined is increased.

A portion of the adhesive remains within the annular space after installation, such that the annular space remains sealed upon curing of the adhesive, thereby preventing leakage through the tubular rivet body.

In a preferred embodiment of the invention, the installation tool has a shaped O-ring to provide a seal that intersects with the rivet head portion. During installation, a pressure is applied to the shaped O-ring to prevent escape of the adhesive to an exterior of the tubular rivet body. In this manner, the adhesive is forced from the annular space to a region between the faying surfaces, as well as between the tubular rivet body and interior surfaces of the aligned holes of the parts to be joined.

Other objects and advantages of the invention will be understood from the description of preferred embodiments. Reference will be made to drawing figures that are described in the following section.

DETAILED DESCRIPTION OF THE PREFERRED EMBODIMENT

The practice of the present invention will be illustrated by describing a blind rivet system 5 for joining a plurality of parts.

Figure 1:
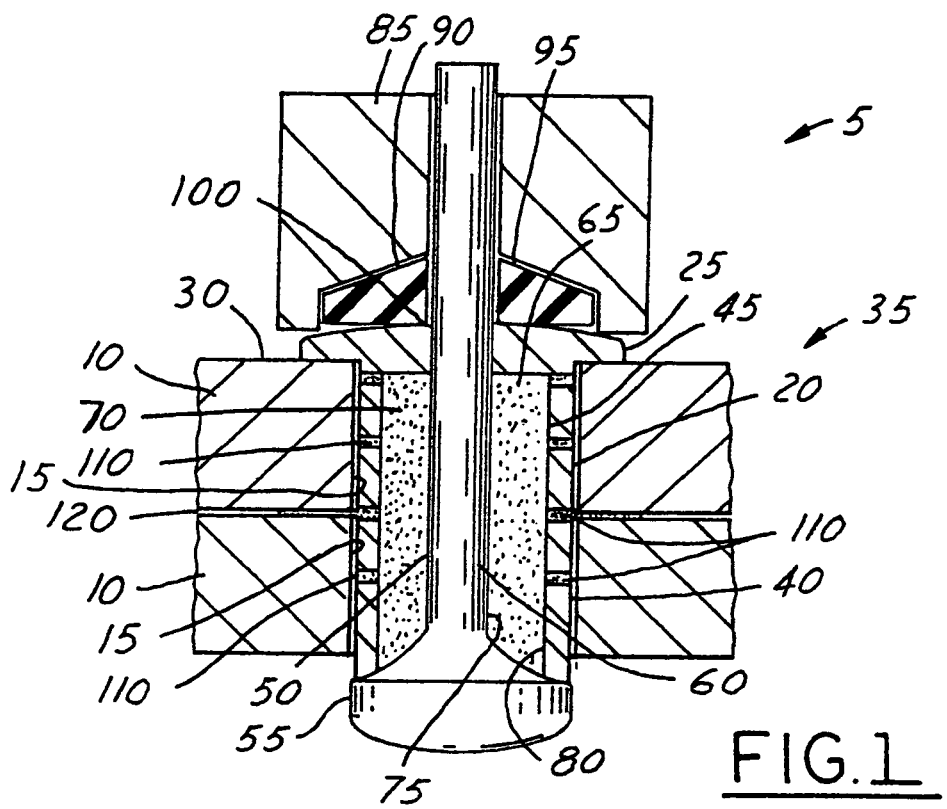
FIG. 1 is a side-sectional view of the blind rivet system prior to installation by the installation tool.

As can be seen in FIG. 1, a plurality of parts 10, two shown in the pictured embodiment, are disposed atop each other and include holes 15 formed therein that are aligned to facilitate joining of the parts. A tubular rivet body 20 is disposed in the aligned holes 15. The tubular rivet body 20 comprises a rivet head portion 25 that is shaped to engage a surface 30 of the part 10 on the visible side 35 of the rivet installation. A sleeve portion 40 having a smaller diameter than the rivet head portion 25 extends from the rivet head portion 25 and through the aligned holes 15. The rivet head portion 25 and sleeve portion 40 include a longitudinal bore 45 that is formed therein.

A mandrel 50 including a head portion 55 having a diameter greater than the longitudinal bore 45 and a shaft portion 60 extending from the head portion 55 is disposed within the bore 45. The head portion 55 is disposed proximate the end of the rivet body 20 opposite of the rivet head portion 25 described above.

An adhesive 65 is disposed in an annular space 70 that is defined by an interior surface 80 of the bore 45 and an exterior surface 75 of the shaft portion 60. An installation tool 85 is provided and includes a seal 90 that intersects with the rivet head portion 25 during installation of the blind rivet system 5. In a preferred aspect of the present invention, the seal 90 comprises a shaped O-ring 95 to seal a gap 100 between the mandrel 50 and rivet head portion 25. The shaped O-ring seal 95 maintains an adhesive 65 within the tubular rivet body 20 during installation, as will be discussed in more detail below.

In a preferred aspect, and as shown in FIG. 1, the sleeve portion 40 of the tubular rivet body 20 includes a plurality of holes 110 formed therein for allowing the adhesive 65 to flow from an annular space 70 to a region between the faying surfaces 120 of the parts to be joined, as well as to a region between the tubular rivet body and interior surfaces 125 of the aligned holes 15 of the parts to be joined. The plurality of holes 110 ensures that there is an even distribution of adhesive 65 during installation of the blind rivet system 5, as well as allows for a quicker installation, as the adhesive 65 is able to travel in an efficient manner through multiple orifices rather than through a single orifice.

Also, disclosed as an aspect of the present invention is a method of blind riveting to join a plurality of parts. The method includes providing parts 10 having aligned holes 15 of the appropriate size. A blind rivet having a tubular rivet body 20 having a head portion 25 that engages a surface of one of the parts 10 to be joined, and a sleeve portion 40 extending from the rivet head portion 25 is provided. As stated above, a longitudinal bore 45 is formed through the tubular rivet body 20 such that a mandrel 50 having a head portion 55 with a diameter greater than the bore 45, and a shaft portion 60 extending from the head portion 55 is disposed within the bore 45. The head portion 55 of the mandrel 50 is disposed proximate the end of the rivet body 20 opposite the rivet head portion 25. An adhesive 65 is disposed in an annular space 70 defined by an interior surface 80 of the bore 45 and an exterior surface 75 of the shaft portion 60. The tubular rivet body 20 is inserted into the aligned holes 15 such that the rivet head portion 25 of the tubular body 20 intersects a surface of one of the plurality of parts with the mandrel head portion 55 being placed on the opposite surface of the plurality of parts. An installation tool 85 is provided that includes a seal 90 that intersects with the rivet head portion 25 to prevent the flow of adhesive 65 outside of the tubular rivet body 20.

During the installation process, the blind rivet installation tool 85 grips the shaft 60 of the mandrel 50 and draws the mandrel head portion 55 into the bore 45 forming a blind head 130, thereby mechanically attaching the plurality of parts. A pressure is applied to the seal 90 to prevent escape of the adhesive 65 such that the adhesive 65 is extruded from the annular space 70 to a region between the faying surfaces 120 of the plurality of parts, as well as to a region between the tubular rivet body and interior surfaces 125 of the aligned holes 15 of the parts to be joined.

Figure 2:
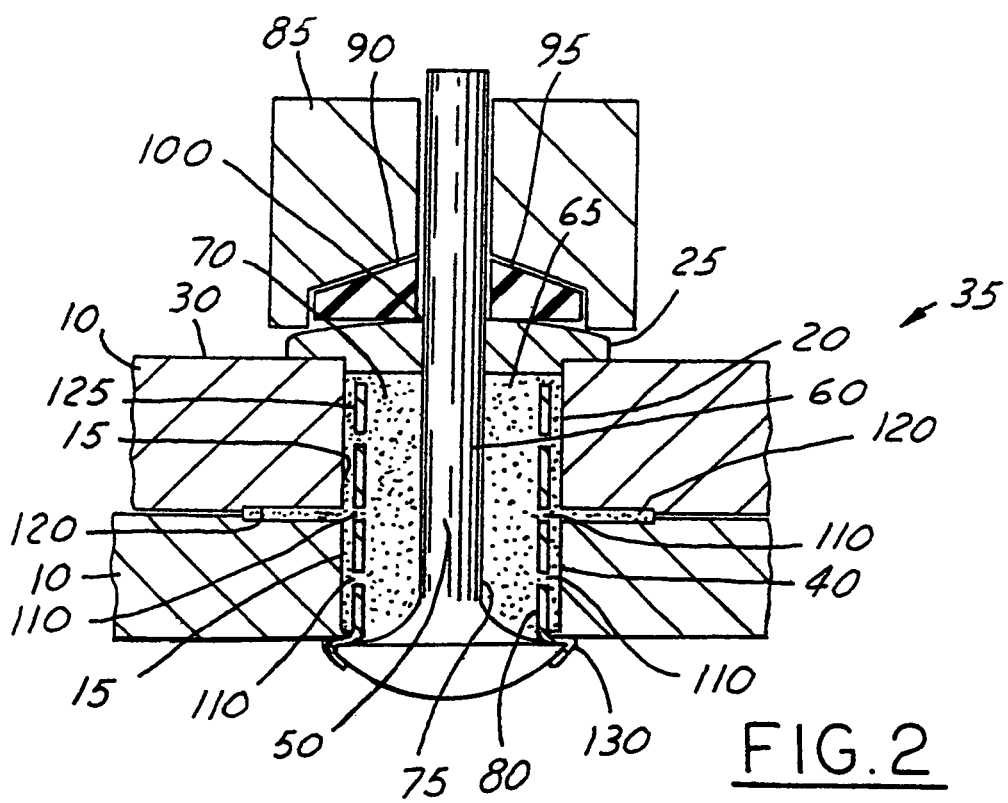
FIG. 2 is a side-sectional view of the blind rivet system during installation of the blind rivet detailing the flow of adhesive between the faying surfaces and between the rivet body and interior surfaces of the aligned holes of the parts to be joined.
Figure 3:
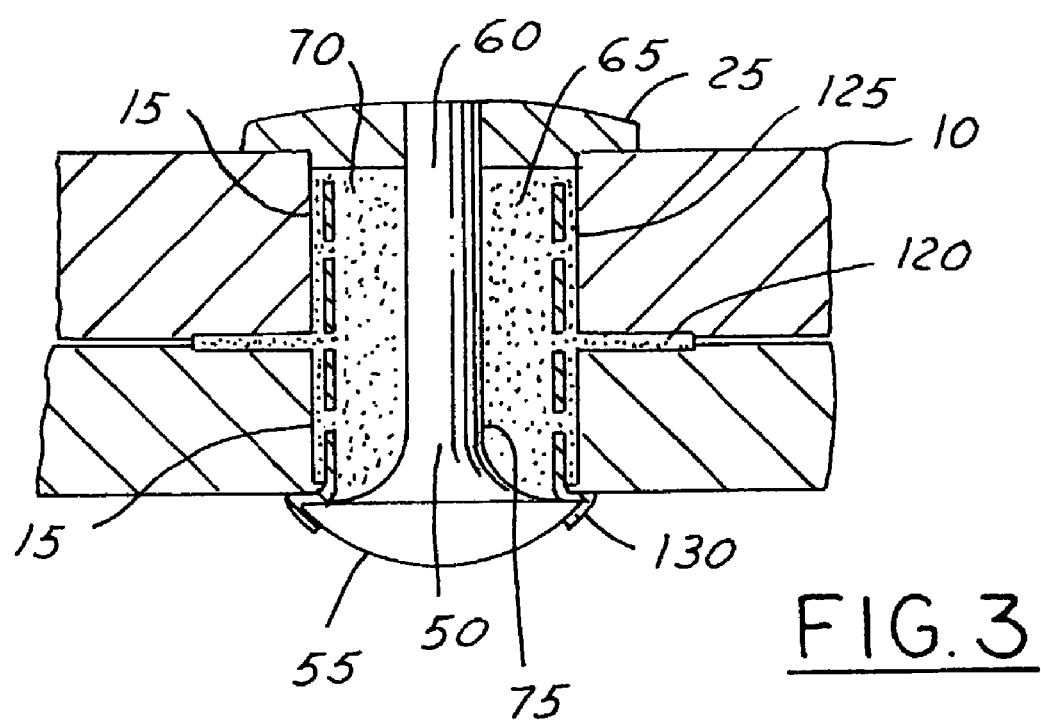
FIG. 3 is a side-sectional view of the blind rivet system after installation of the blind rivet with the shaft of the mandrel trimmed to the level of the rivet head.

As can be seen in FIGS. 2 and 3 following installation, the adhesive 65 is distributed between the faying surfaces 120 of the two parts to be joined thereby increasing the static strength of the bond between the two parts through the coupling of the two parts by an adhesive bond. Also, it can be seen that adhesive 65 is also distributed between the tubular rivet body 20 and the interior surfaces 125 of the aligned holes 15. In this manner, the interaction between the rivet body 20 and parts to be joined is increased due to the presence of adhesive, as well as the mechanical deformation forming a blind head 130. Also, with reference to FIG. 2, it can been seen that a portion of the adhesive 65 remains within the annular space 70 defined by an interior surface 80 of the bore 45 and an exterior surface 75 of the shaft 60 such that upon curing the blind rivet is sealed to prevent leakage through the tubular rivet body 20.

In a preferred aspect of the invention, the adhesive may be cured as the plurality of parts is processed, such as through a paint baking cycle thereby completely curing the adhesive 65. Preferred adhesives 65 for use by the present invention include epoxy and other condensation cured resins.

While the invention has been described in terms of a certain preferred embodiment, it is apparent that other embodiments could readily be devised by one skilled in the art. The scope of the invention is to be considered limited only by the following claims.

What is claimed is:

1. A blind rivet system for joining at least two parts with facing surfaces, a surface accessible for rivet insertion, an inaccessible surface, and a combined thickness at a joining place, the parts including holes formed therein at the joining place through the combined thickness and facing surfaces, the holes aligned to facilitate joining of the parts, said blind rivet system comprising:

a tubular rivet body disposed in the aligned holes, the tubular rivet body comprising a rivet head portion engaging the accessible surface and a sleeve portion extending from the rivet head portion past the inaccessible surface, the rivet head portion and sleeve portion including a longitudinal bore formed therein, the sleeve portion having a length and a circumference and a plurality of adhesive outlet holes spaced along the length and around the circumference of the sleeve portion;

a mandrel including a head portion having a diameter greater than the bore for deforming the rivet body outwardly and a shaft portion extending from the head portion, the shaft portion disposed in the bore, and wherein the head portion is disposed proximate the end of the rivet body opposite the rivet head portion;

an adhesive disposed in an annular space defined by an interior surface of the bore and an exterior surface of the shaft portion;

an installation tool having a seal that intersects with the rivet head portion whereby during installation the head portion is drawn within the bore of the tubular rivet body to form a blind rivet head engaging the inaccessible surface and wherein the head portion drives the adhesive from the annular space through the adhesive outlet holes to a region between the facing surfaces of the parts to be joined and to a region between the tubular rivet body and interior surfaces of the aligned holes of the parts to be joined.

2. The blind rivet system of claim 1 wherein the seal comprises a shaped O-ring.

3. The blind rivet system of claim 1 wherein at least a portion of the adhesive remains within the annular space after installation whereby the annular space is sealed to prevent leakage through the tubular rivet body.

4. A method of blind riveting to join a plurality of parts comprising the steps of:

a) providing at least two parts with facing surfaces, a surface accessible for rivet insertion, an inaccessible surface, and a combined thickness at a joining place, the parts having aligned holes at the joining place through the combined thickness and facing surfaces;

b) providing a blind rivet comprising:

a tubular rivet body comprising a rivet head portion for engaging the accessible surface and a sleeve portion for extending from the rivet head portion past the inaccessible surface, the rivet head portion and sleeve portion including a longitudinal bore formed therein, the sleeve portion having a length and a circumference and a plurality of adhesive outlet holes spaced along the length and around the circumference of the sleeve portion;

a mandrel including a head portion having a diameter greater than the bore and a shaft portion extending from the head portion, the shaft portion disposed in the bore, and wherein the head portion is disposed proximate the end of the rivet body opposite the rivet head portion;

an adhesive disposed in an annular space defined by an interior surface of the bore and an exterior surface of the shaft portion;

c) inserting the tubular rivet body into the aligned holes such that the rivet head portion of the tubular rivet body engages the accessible surface of the plurality of parts;

d) positioning an installation tool having a seal that intersects with the rivet head portion;

e) installing the blind rivet wherein the installation tool grips the shaft of the mandrel and draws the mandrel head portion into the bore forming a blind head mechanically attaching the plurality of parts and wherein a pressure is applied to the seal preventing escape of the adhesive such that the adhesive is extruded through the adhesive outlet holes from the annular space to a region between the facing surfaces of the plurality of parts to be joined and to a region between the tubular rivet body and interior surfaces of the aligned holes of the parts to be joined.

5. The method of claim 4 further including the step of curing the adhesive after installation.

6. The method of claim 4 wherein the seal comprises a shaped O-ring.

* * * * *